US010865136B2

(12) United States Patent
Simpson et al.

(10) Patent No.: US 10,865,136 B2
(45) Date of Patent: Dec. 15, 2020

(54) TRANSPARENT AND INSULATING MATERIALS HAVING EVACUATED CAPSULES

(71) Applicant: Alliance for Sustainable Energy, LLC, Golden, CO (US)

(72) Inventors: Lin Jay Simpson, Lakewood, CO (US); Chaiwat Engtrakul, Louisville, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 15/656,378

(22) Filed: Jul. 21, 2017

(65) Prior Publication Data

US 2018/0022641 A1 Jan. 25, 2018

Related U.S. Application Data

(60) Provisional application No. 62/365,621, filed on Jul. 22, 2016.

(51) Int. Cl.
*C03C 11/00* (2006.01)
*C03B 19/10* (2006.01)
(Continued)

(52) U.S. Cl.
CPC .......... *C03C 11/002* (2013.01); *C03B 19/107* (2013.01); *C01P 2004/32* (2013.01);
(Continued)

(58) Field of Classification Search
None
See application file for complete search history.

(56) References Cited

U.S. PATENT DOCUMENTS

| 3,030,215 A | 4/1962 | Veatch et al. |
| 3,607,169 A | 9/1971 | Coxe |

(Continued)

FOREIGN PATENT DOCUMENTS

| CN | 102618016 A | 8/2012 |
| JP | 2014094865 A * | 5/2014 |

(Continued)

OTHER PUBLICATIONS

JP 2014-094865 English Machine Translation (Year: 2014).*

(Continued)

*Primary Examiner* — Alicia Chevalier
*Assistant Examiner* — Elaine M Vazquez
(74) *Attorney, Agent, or Firm* — Michael A. McIntyre

(57) ABSTRACT

Transparent and insulating materials having evacuated capsules are provided. According to an aspect of the invention, a method includes forming evacuated capsules within a solution, and dispersing and suspending the evacuated capsules within the solution such that a packing density of the evacuated capsules within the solution is greater than 30%, and a visible light transmission of the solution including the evacuated capsules is greater than 75%. According to another aspect of the invention, a layer includes a plurality of evacuated capsules distributed within a dried sol-gel. A thermal conductivity of the layer is between 0.02 W/m-K and 0.001 W/m-K, and the layer has a visible light transmission of greater than 30%.

17 Claims, 9 Drawing Sheets

(51) Int. Cl.
  *C03C 17/245* (2006.01)
  *E06B 7/28* (2006.01)
(52) U.S. Cl.
  CPC ...... *C01P 2004/34* (2013.01); *C01P 2004/84* (2013.01); *C03C 17/2453* (2013.01); *C03C 2217/211* (2013.01); *C03C 2217/216* (2013.01); *C03C 2218/15* (2013.01); *E06B 7/28* (2013.01); *Y10T 428/249974* (2015.04)

(56) References Cited

U.S. PATENT DOCUMENTS

| | | | |
|---|---|---|---|
| 4,303,061 | A | 12/1981 | Torobin |
| 4,336,338 | A | 6/1982 | Downs et al. |
| 4,463,047 | A | 7/1984 | Matteucci et al. |
| 5,378,520 | A | 1/1995 | Nagaoka et al. |
| 5,713,974 | A | 2/1998 | Martin et al. |
| 6,058,979 | A | 5/2000 | Watkins |
| 6,284,809 | B1 | 9/2001 | Plummer et al. |
| 6,699,559 | B1 | 3/2004 | Milburn |
| 6,858,280 | B2 | 2/2005 | Allen et al. |
| 8,445,101 | B2 | 5/2013 | Kipp et al. |
| 8,522,829 | B2 | 9/2013 | D'Souza et al. |
| 8,714,206 | B2 | 5/2014 | Jackson et al. |
| 2005/0266180 | A1* | 12/2005 | Bi .................. B41M 5/52 428/32.34 |
| 2012/0164413 | A1 | 6/2012 | Hara et al. |
| 2012/0240634 | A1* | 9/2012 | Sanderson ............ C03C 17/002 65/60.5 |
| 2017/0073237 | A1* | 3/2017 | Lim ................. C01B 33/18 |

FOREIGN PATENT DOCUMENTS

| | | | |
|---|---|---|---|
| WO | WO 2001/21906 A1 | 3/2001 | |
| WO | WO-2015182878 A1 * | 12/2015 | ............. C01B 33/12 |

OTHER PUBLICATIONS

Allen, M. et al., "Advances in Microsphere Insulation Systems," 2003 Cryogenic Engineering Conference, 8 pages.
Chen, M. et al., "A Method for the Fabrication of Monodisperse Hollow Silica Spheres," Advanced Materials, vol. 18, 2006, pp. 801-806.
Chen, H. et al., "One-Step Synthesis of Monodisperse and Hierarchically Mesostructured Silica Particles with a Thin Shell," American Chemical Society, Langmuir, vol. 26, No. 16, Jul. 12, 2010, pp. 13556-13563.
Cunnington, G. et al., "Apparent Thermal Conductivity of Uncoated Microsphere Cryogenic Insulation," Advances in Cryogenic Engineering 22, 1977, pp. 263-271.
Du, X. et al., "Facile Fabrication of Hollow Mesoporous Silica Nanospheres for Superhydrophilic and Visible/Near-IR Antireflection Coatings," Chemistry-A European Journal, vol. 17, 2011, pp. 8165-8174.
Du, Y. et al., "Hollow Silica Nanoparticles in UV-Visible Antireflection Coatings for Poly(methyl methacrylate) Substrates," ACS Nano, vol. 4, No. 7, Jun. 10, 2010, pp. 4308-4316.
Fesmire, J. et al., "Thermal Performance Testing of Glass Microspheres Under Cryogenic Vacuum Conditions," AIP Conference Proceedings, vol. 710, 2004, pp. 612-618.
Li, X. et al., "Self-Cleaning Antireflective Coatings Assembled from Peculiar Mesoporous Silica Nanoparticles," American Chemical Society, Langmuir, 2010, vol. 26, No. 16, pp. 13528-13534.
Li, B. et al., "Effect of microstructure and physical parameters of hollow glass microsphere on insulation performance," Materials Letters, vol. 65, 2011, pp. 1992-1994.
Li, C. et al., "The influence of sol-gel processing on the electrochromic properties of mesoporous $WO_3$ films produced by ultrasonic spray deposition," Solar Energy Materials & Solar Cells, vol. 121, 2014, pp. 163-170.
Liao, Y. et al., "Thermal conductivity of powder silica hollow spheres," Thermochimica Acta, vol. 526, 2011, pp. 178-184.
Liao, Y. et al., "Composite thin film of silica hollow spheres and waterborne polyurethane: Excellent thermal insulation and light transmission performances," Materials Chemistry and Physics, vol. 133, 2012, pp. 642-648.
Manoudis, P. et al., "Superhydrophobic Composite Films Produced on Various Substrates," American Chemical Society, Langmuir, 2008 vol. 24, pp. 11225-11232.
Microsphere Insulation Panels, John F. Kennedy Space Center, Florida, Tech Briefs, available at www.techbriefs.com/component/content/article/5-ntb/tech-briefs/materials/118, last accessed on Jul. 7, 2017, 1 page.
Microstructured Materials Group, SilicaAeroGels, Science of Thermal Properties, available at http://energy.lbl.gov/ecs/aerogels/sa-thermal.html, last accessed on Jul. 7, 2017, 4 pages.
Mueller, R. et al., "Nanoparticle synthesis at high production rates by flame spray pyrolysis," Chemical Engineering Science, vol. 58, 2003, pp. 1969-1976.
National Institute of Standards & Technology, Certificate, Standard Reference Material 1459, Thermal Resistance—Fumed Silica Board, available at https://www-s.nist.gov/srmors/viewcert.cfm?srm-1459, last accessed on Jul. 14, 2017, 3 pages.
Notario, B. et al., "Experimental validation of the Knudsen effect in nanocellular polymeric foams," Polymer, vol. 56, 2015, pp. 57-67.
Pereira, D. et al., "Hollow glass microspheres for temperature and irradiance control in photobioreactors," Bioresource Technology, vol. 158, 2014, pp. 98-104.
Reinker, R. et al., "Thermal Conductivity and Diffusivity of Selected Porous Insulations Between 4 and 300 K," vol. 20, 1975, Cryogenics Division, NBS Institute for Basic Standards, Boulder, Colorado, pp. 343-354.
SBIR-STTR, "Production of Evacuated Microspheres for Thermal Insulation," available at www.sbir.gov/sbirsearch/detail/185619, last accessed on Jul. 24, 2017, 3 pages.
Shanthi, E. et al., Electrical and optical properties of tin oxide films doped with F and (Sb+F), Journal of Applied Physics, vol. 53, No. 3, Mar. 1982, pp. 1615-1621.
Zhou, T. et al., Bandgap Tuning of Silicon Quantum Dots by Surface Functionalization with Conjugated Organic Groups, NanoLetters, vol. 15, 2015, pp. 3657-3663.

* cited by examiner

| Form capsules | → | Evacuate capsules | → | Disperse and suspend evacuated capsules in solution | → | Integrate evacuated capsules to form layer |

TRANSPARENT AND INSULATING MATERIALS HAVING EVACUATED CAPSULES

CROSS-REFERENCE TO RELATED APPLICATION

This application claims priority under 35 U.S.C. § 119 to U.S. Provisional Patent Application No. 62/365,621, filed on Jul. 22, 2016, the contents of which are hereby incorporated by reference in their entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND OF THE INVENTION

Presently, buildings account for approximately 40% of the energy usage and $CO_2$ emissions in the United States, and windows account for approximately 30% to 50% of the energy losses in buildings. This is because the vast majority of the trillions of square feet of installed windows have very poor energy efficiencies. Considering that the life expectancy of installed windows is greater than 30 years, it could take decades and tens of trillions of dollars before they are replaced with higher efficiency windows, and these new windows may still be less energy efficient than the walls and roofs of buildings.

To address the overall energy being consumed by buildings, improvements are needed in both space conditioning and building envelope technologies. However, while there are relatively inexpensive methods to treat the energy loss through roofs and walls of older buildings by applying low cost insulation, the only way to substantially improve the insulation value of windows is through replacement with relatively expensive new windows that typically require substantial construction and add substantial weight. While the walls and roofs of older buildings can be retrofitted to have R-values in the 15 to 50 range, new replacement windows typically have R values less than 3 and older windows have R values much less than 1. In addition, replacement of windows can be a very costly ($200 to $1000 just for the window) and arduous task. Thus, there is a need to improve the energy efficiency of installed windows in older buildings at a lower cost.

Presently, vacuum insulated glass (VIG), in which a vacuum is pulled between two panes of glass, provides an energy-efficiency solution for windows with thermal conductivities around 0.007 Watts per meter-degree Kelvin (W/m-K) (i.e., insulation value R12) with low-e coatings. However, VIG is expensive, with costs projected to be approximately \$6/ft$^2$ (approximately 25% more than present conventional windows). Furthermore, VIG has substantial differential thermal expansion problems that require tempered glass, which also increases costs and reduces durability. Finally, due to the fact that VIG needs to be sealed at the edges, it is only available in preset assembled sizes, making use with retrofitting more expensive and difficult. Thus, it would be advantageous to retrofit installed windows and to develop new windows to improve energy efficiency by using transparent insulating materials that overcome the drawbacks of VIG, such as high cost, low durability, edge seal leaking, and weight problems.

Recently, hollow glass microspheres (HGMs), also known as glass bubbles, have been incorporated into insulation systems, hydrogen storage, and other applications. Typically, these HGMs are on the order of 10 micrometers to 1000 micrometers in diameter, and scatter visible light. HGMs may be filled with a fluid or gas, evacuated, and/or coated with materials such as dielectrics and metals. Commercially available HGMs that have not been evacuated are used to improve the insulating value of many products including paint, vacuum insulating panels, and insulation for cryogenic applications. However, the size, thickness, and/or density of the HGMs needed to achieve a high insulation value prevents their use as a transparent layer.

When used in very thin layers, such as a monolayer or two of HGMs, HGMs can be used for antireflection coatings for windows, for visibly transparent applications, and to improve the optical quality of glass. For example, when used as an antireflection coating, HGMs improved the transmission of visible light from approximately 90% to 96%, while reducing the reflection from 8% to 2%. However, these layers are too thin to provide a substantial increase of the insulation value. Further, CN102618016 discloses a method of incorporating evacuated HGMs within a resin matrix to produce a transmissive and insulating film. However, because the HGMs are limited to 1% of the mass of the resin, the reduction in the thermal conductivity of the film is minimal. Specifically, the thermal conductivity of the film is reported to be approximately 0.05 W/m-K. Accordingly, it would be advantageous to provide a method of producing a film in which the thermal conductivity is substantially reduced while the visible light transmission is maintained.

SUMMARY OF THE INVENTION

Exemplary embodiments of the invention use evacuated capsules to provide transparent and insulating materials. According to an aspect of the invention, a method includes forming evacuated capsules within a solution, and dispersing and suspending the evacuated capsules within the solution such that a packing density of the evacuated capsules within the solution is greater than 30%, and a visible light transmission of the solution including the evacuated capsules is greater than 75%.

The dispersing and suspending of the evacuated capsules may include adjusting a pH of the solution to a value between 9 and 14, and adding a polycation or a polyanion to the solution. The packing density of the evacuated capsules within the solution may be greater than 70%.

The method may also include processing the solution with a sol-gel method, and drying the processed solution to form a layer. The method may also include adding a strengthening agent to the solution before processing the solution. The strengthening agent may include poly(vinyl alcohol) and/or boric acid.

Forming the evacuated capsules may include forming templates using dodecanethiol and cetyl-trimethylammonium bromide, coating the templates with a silica-gel, and heating the templates to a temperature of at least 250° C. in vacuum. Forming the evacuated capsules may also include performing atomic layer deposition, physical vapor deposition, chemical vapor deposition, or solution phase deposition to deposit a low-emissivity coating on shells formed by heating the templates.

Each of the evacuated capsules may have a lateral dimension between 50 nm and 300 nm. The lateral dimension may be between 80 nm and 100 nm.

According to another aspect of the invention, a layer includes a plurality of evacuated capsules distributed within a dried sol-gel. A thermal conductivity of the layer is between 0.02 W/m-K and 0.001 W/m-K, and the layer has a visible light transmission of greater than 30%.

Each of the evacuated capsules may have a lateral dimension between 50 nm and 300 nm. The lateral dimension may be between 80 nm and 100 nm. A packing density of the evacuated capsules within the dried silica-gel is greater than 30%. The packing density may be greater than 70%.

Each of the evacuated capsules may include a silica shell. Each of the evacuated capsules may also include a low-e coating formed on the silica shell. The low-e coating may include at least one of tin oxide or zinc oxide.

The visible light transmission may be greater than 75%. At least one of the evacuated capsules may include a plurality of primary shells surrounded by a secondary shell.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a flowchart of a method of forming a transparent and insulating film according to exemplary embodiments of the invention;

Figure 2:
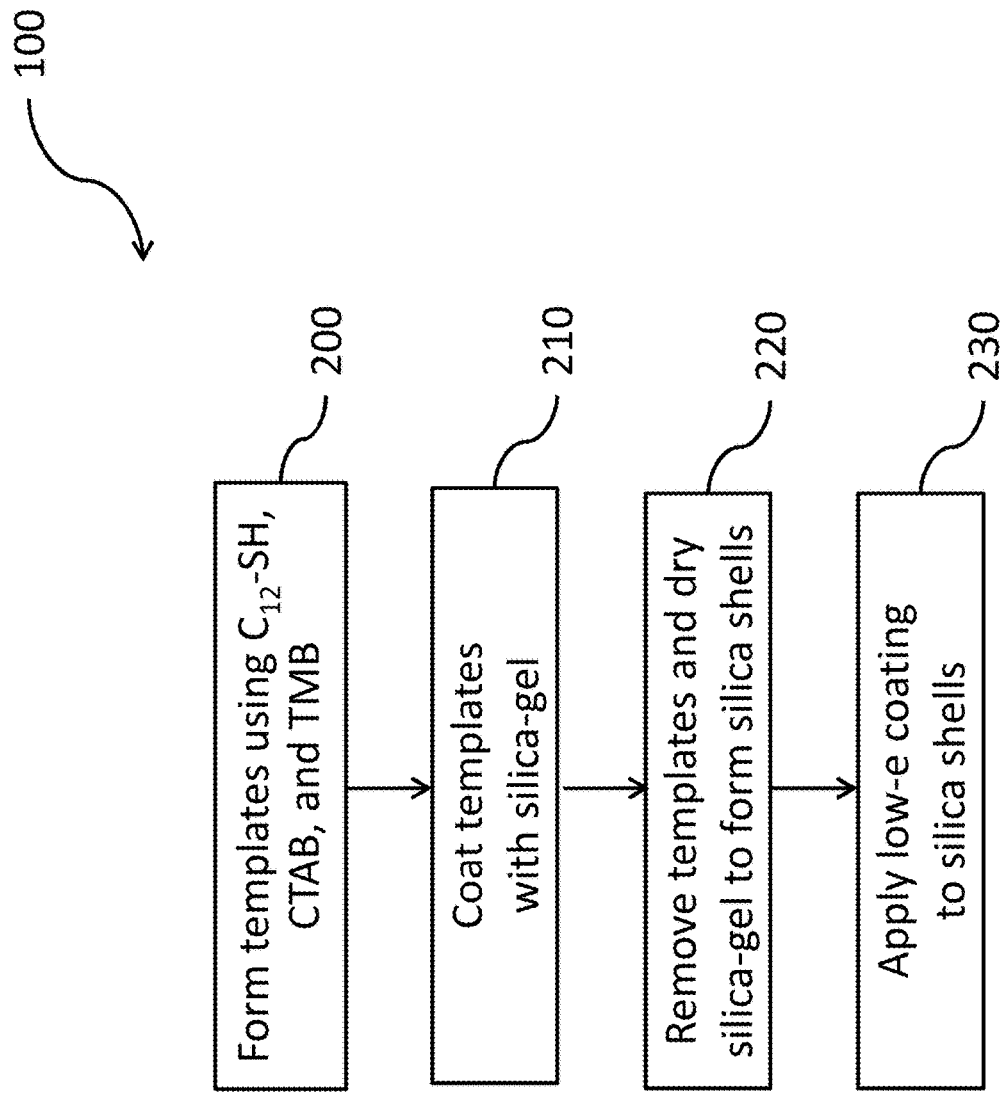
FIG. 2 shows a flowchart of a solution phase method for forming capsules according to exemplary embodiments of the invention.

REFERENCE NUMBERS 100 form capsule
110 evacuate capsule
120 disperse and suspend capsule
130 integrate capsule
200 form template
210 coat template
220 remove template and dry
230 apply low-e coating
300 layer (i.e. film)
310 thickness
320 integrated evacuated capsules
330 pore (i.e. pockets)
340 primary shell (i.e. evacuated capsule, silica shell)
350 secondary shell
600 add strengthening agent
610 process solution with sol-gel method
620 dry sol-gels

DETAILED DESCRIPTION OF EXEMPLARY EMBODIMENTS

FIG. 1 shows a flowchart of a method of forming a transparent and insulating film according to exemplary embodiments of the invention. Evacuated capsules are incorporated into a layer of material to achieve the high R values needed for window applications, such as R–5 to R–20, with a layer thickness between 0.125 inches and 0.25 inches. As discussed in further detail below, the size and arrangement of the evacuated capsules are designed to minimize the effect of the layer on the transparency of a window to which the layer will be applied.

Figure 3A:
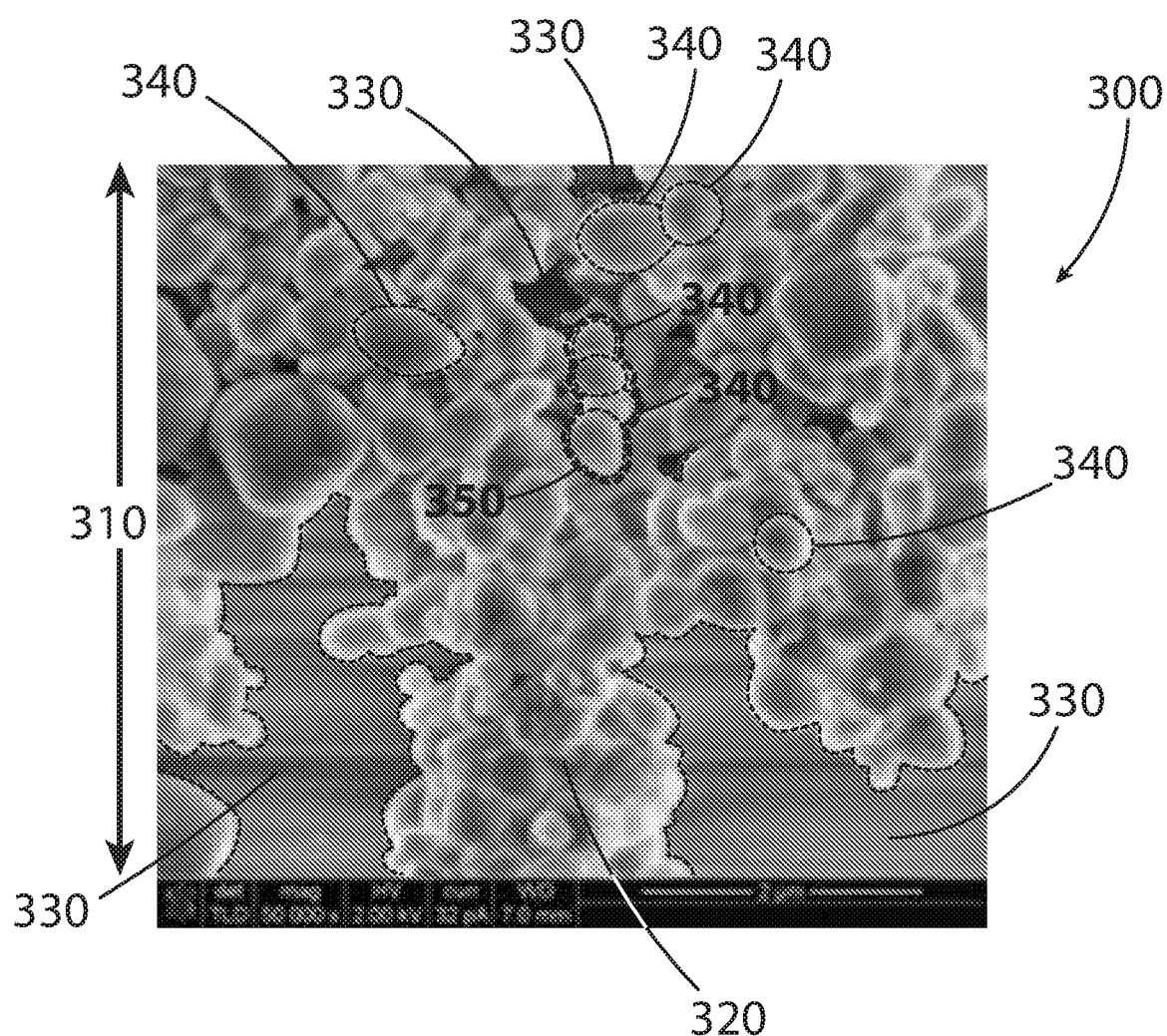
FIGS. 3(a) and 3(b) show a scanning electron microscopy (SEM) image and a transmission electron microscopy (TEM) image, respectively, of capsules that were constructed to have a diameter between 80 nm and 100 nm.
Figure 3B:
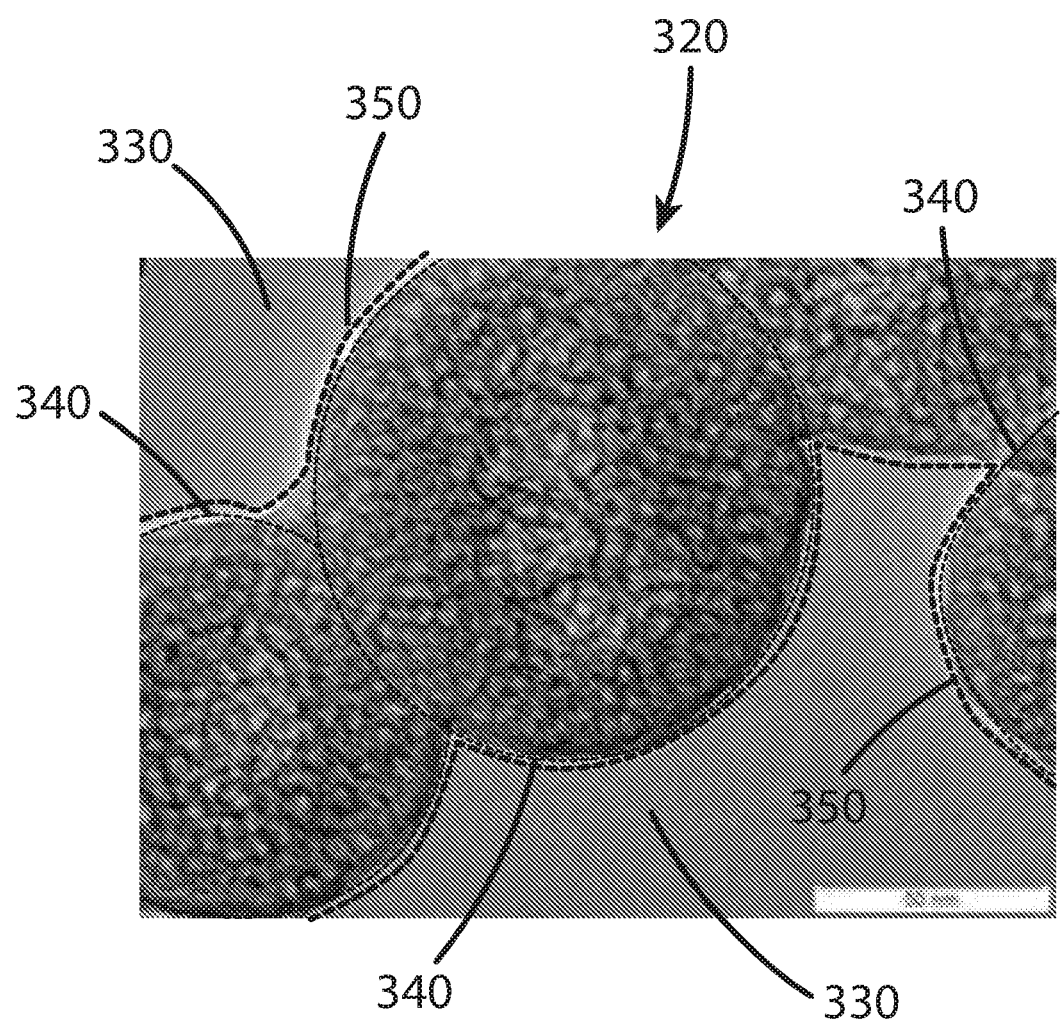

Referring to FIG. 3(a), a layer 300 is illustrated according to some embodiments of the present disclosure. The layer 300, having a thickness 310, includes evacuated capsules 340 having secondary shells 350 constructed of dried sol-gel material. The layer 300 includes pores 330 positioned within integrated and evacuated capsules 320. FIG. 3(b) zooms in on a portion of the layer 300 to better illustrate a secondary shell 350 (e.g. dried sol-gel) around multiple primary shells 340 forming integrated and evacuated capsules 320 and pores 330.

As shown in FIG. 1, the method begins by forming capsules 340 at step 100 (see FIGS. 3(a) and 3(b) for capsules 340, secondary shell 340, etc.). In general, related art commercial manufacturing of HGMs involves blowing air or gases through molten glass. Because of viscosity limitations, this method cannot make glass bubbles smaller than about 10 micrometers in diameter. In contrast, exemplary embodiments of the invention may use solution phase processes to form capsules 340 having a lateral dimension between 50 nm and 300 nm. For example, solution phase processes involving approximately 0.1 liter of solution may be used to create 5 to 10 mL of silica capsules 340 with different sizes (e.g., a diameter between 70 nm and 120 nm) and shapes (e.g., spherical, spheroid, pseudo-cylindrical, pseudo-cubic, and capsules with concave sides). For example, an efficient spray process using liquid sources may be used to form hollow silica structures 340 from a templating route using either aerosol spray pyrolysis or plasma spray processes.

FIG. 2 shows a flowchart of a solution phase method for forming 100 the capsules according to exemplary embodiments of the invention. During the solution phase method, templates are formed using dodecanethiol ($C_{12}$-SH), cetyl-trimethylammonium bromide (CTAB), and trimethylbenzene (TMB) at step 200. The $C_{12}$-SH, CTAB, and TMB form nano-emulsion droplets that serve as the templates. As an alternative, poly(methyl methacrylate) (PMMA) may be used to form the nano-emulsion droplets instead of the $C_{12}$-SH, CTAB, and TMB. In one example, the $C_{12}$-SH, CTAB, and TMB are mixed in water at a temperature of 80° C. and a mixing speed of 2500 RPM. The molar ratio of TMB to CTAB may be 2, and may be adjusted to between 3 and 4. The molar ratio of TMB to CTAB, the amount of $C_{12}$-SH, and the initial amount of TEOS may be adjusted to create templates with different shapes. The $C_{12}$-SH to CTAB ratio and stirring speed may also be changed to adjust the morphology and structure of the templates. For example, by adjusting the molar ratio of TMB to CTAB to between 3 and 4, decreasing the initial amount of TEOS from 1.5 ml to 0.75 ml/100 ml solvent, and then adding the remaining TEOS after 2 hours, templates can be made that increase the stacking density of the capsules. Also, by adjusting the stirring speed from approximately 2500 revolutions per minute to 2000 revolutions per minute, and adding 1 ml TEOS per 100 ml of solvent, to start, more cubical or oblate spheroid templates can be synthesized.

The templates may then be coated with a silica-gel such as tetraethoxysilane (TEOS) in step 210. The silica-gel may coat individual templates and/or groups of templates. The templates are then removed by evaporation and the silica-gel is dried at high temperatures of approximately 50° C. at step 220, thereby creating hollow silica shells 340 (i.e. primary shell, evacuated capsules in FIGS. 3(a) and 3(b)). In general, any material may be used for the templates, provided that it has the desired size and shape to form the shells, and can be removed after the shells are formed.

Primary shells 340 may be formed by coating individual templates with silica-gel in step 210, while secondary shells (reference number 350 in FIGS. 3(a) and 3(b)) may be formed by coating multiple templates that are in contact with each other with silica-gel in step 210. The thicknesses of the primary shell 340 and secondary shells 350 may be varied from a few nanometers to 20 nm based on the amount of silica-gel that is added during step 210. Further, the silica-gel may be injected into the solution at different times after introducing the initial silica-gel. This causes the primary shells 340 to have different thicknesses and forms the secondary shells 350 around multiple primary shells 340, such that the secondary shells 350 have longer shapes that are similar to cylinders.

FIGS. 3(a) and 3(b) show a scanning electron microscopy (SEM) image and a transmission electron microscopy (TEM) image, respectively, of evacuated capsules 340 that were constructed to have a diameter between 80 nm and 100 nm. As shown in FIGS. 3(a) and 3(b), the geometry of the evacuated capsules 340 may be adjusted to have a cubic shape with a high stacking density and/or non-spherical shapes by the methods discussed above.

Referring again to FIG. 2, a low-emissivity (low-e) coating (not shown) may also be deposited on the silica shells at step 230. The low-e coating is transparent in the visible range of the spectrum (from 390 to 700 nm) and reflects more than 50% in the far infrared range of the spectrum (from 8 to 13 μm). An oxide layer may be used as the low-e coating. For example, tin oxide and/or zinc oxide may be deposited on the silica shells by using atomic layer deposition (ALD). In this case, the silica shells are placed in a vacuum chamber, and vapor phase tin oxide and/or zinc oxide is deposited monolayer-by-monolayer to achieve the desired thicknesses and low-e properties. Alternatively, the low-e coating may be applied by physical vapor deposition, chemical vapor deposition, or solution phase deposition. The low-e coating may have a thickness between 0.5 nm and 10 nm. As another alternative, the low-e coating may be incorporated into the silica-gel that is used to form the shells.

Figure 4:
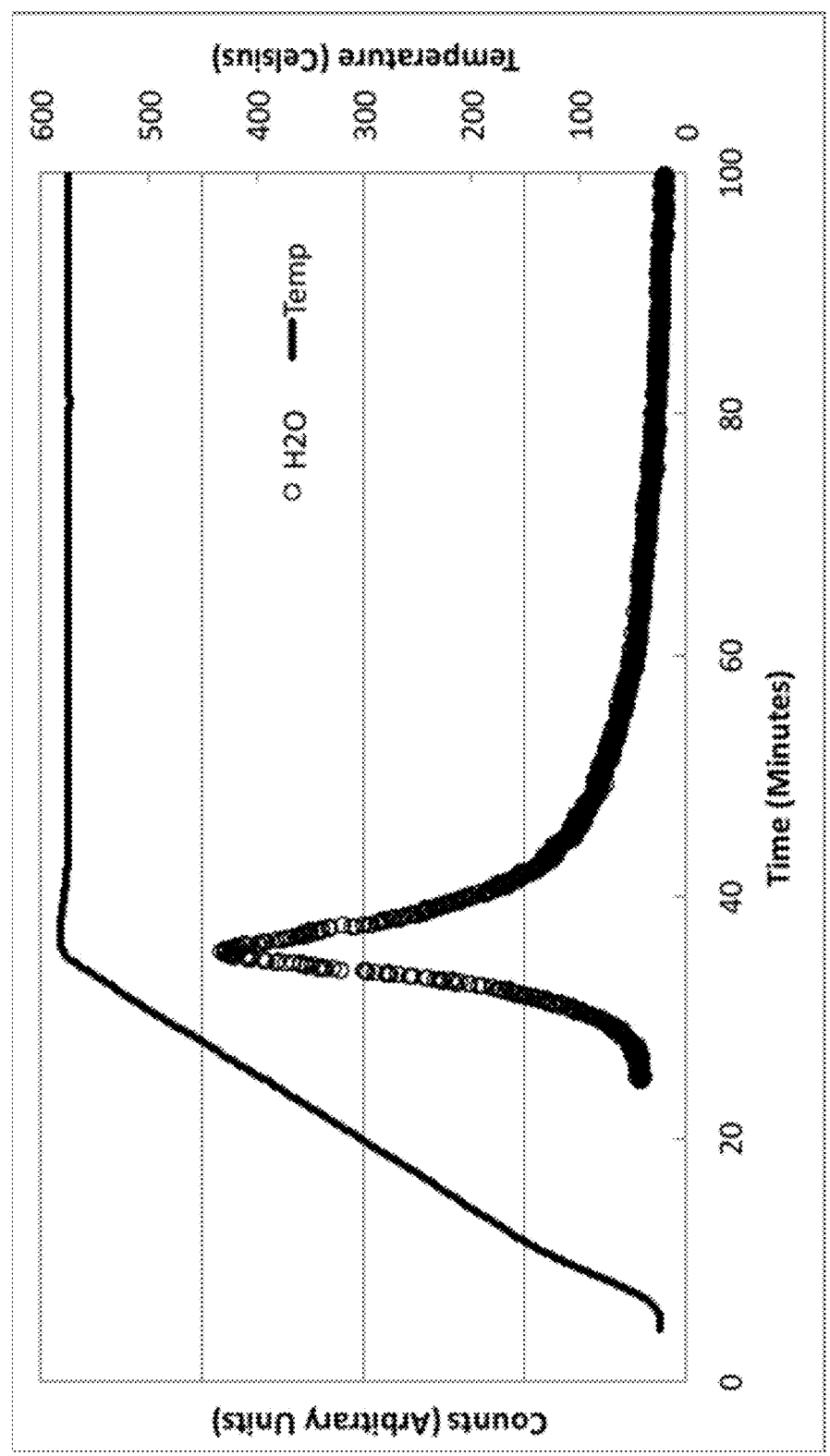
FIG. 4 shows an example of the temperature-programmed desorption spectra of evacuated capsules.

Referring again to FIG. 1, once the capsules have been formed at step 100, the capsules are then evacuated at step 110. FIG. 4 shows the temperature-programmed desorption spectra of evacuated capsules 340. In this example, the air is first evacuated from the secondary shells 350 at a temperature of approximately 250° C., and is then evacuated from the primary shells 340 at a temperature of approximately 400° C. As the temperature increases, the gas diffusion through the silica shells increases. For this specific sample, at approximately 400° C., gasses (such as the water shown in FIG. 4) start to come out from inside the silica shells, as measured by a mass spectrometer in the vacuum chamber. Over time, all of the water and the other gasses come out of the shells, leaving behind a vacuum inside of the shells.

The temperature applied at step 110 of FIG. 1 may be adjusted based on the thickness, composition, and structure of the capsules. For example, thicker and denser shells require higher temperatures to be evacuated. Further, the chemical composition of the capsules can affect the molecular transport rate through the shells, thus affecting the temperature needed for transport. A final pressure inside the capsules of less than 1 microtorr may be achieved to minimize the thermal conductivity. However, the internal pressure of the evacuated capsules 340 may vary depending on the desired thermal conductivity, with a lower pressure required for higher thermal conductivities.

Figure 5B:
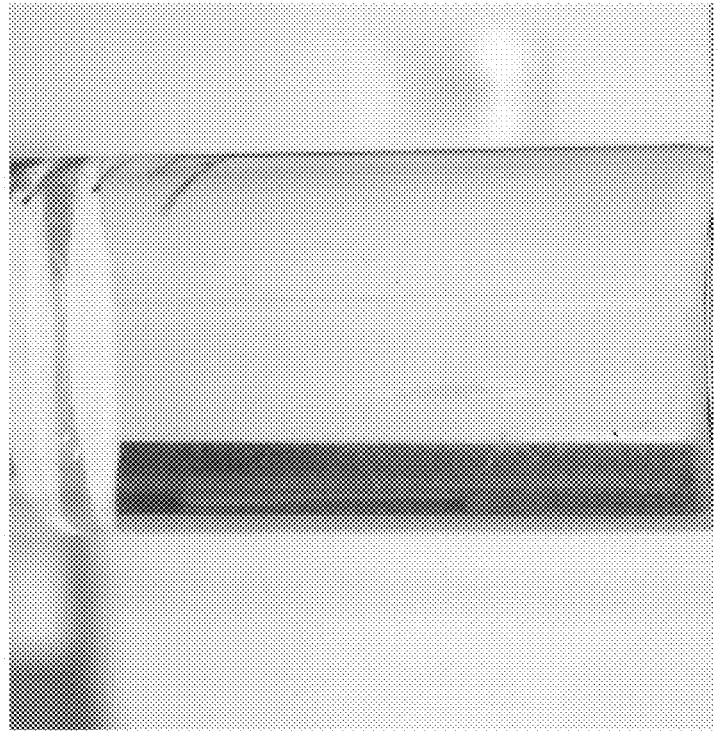
FIG. 5(a) shows an example of evacuated capsules as formed in a solution, and 5(b) shows an example in which the evacuated capsules are dispersed and suspended within the solution in order to increase the transparency.
Figure 5A:
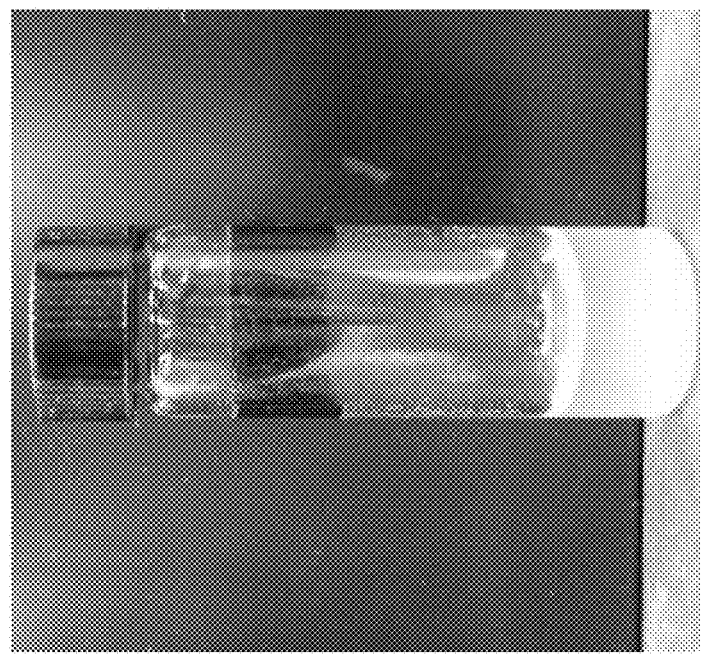

As shown in FIG. 1, the evacuated capsules 340 are then dispersed and suspended in the solution at step 120. This step may be performed at ambient temperature and pressure. FIG. 5(a) shows an example of evacuated capsules 340 as formed in a solution by the methods discussed above. As shown in FIG. 5(a), the evacuated capsules 340 initially agglomerate together to form clusters that are large enough to scatter light, and thus create a whitish-colored and opaque solution. In contrast, FIG. 5(b) shows an example in which the evacuated capsules 340 are subsequently dispersed and suspended within the solution in order to increase the transparency. This may be achieved by adjusting the pH of the solution to a value between 9 and 14, and/or adding a dispersant to the solution. In this example, the evacuated capsules 340 are dispersed and suspended such that the visible light transmission is greater than 85%. However, the visible light transmission may have any value greater than 75%. The pH of the solution may be adjusted by adding a material such as sodium hydroxide. The dispersant may be a polycation such as poly(diallyldimethylammonium chloride) (PDDA) or a polyanion such as sodium poly(4-styrenesulfonate) (PSS). The evacuated capsules 340 remain dispersed in the solution indefinitely such that the visible light transmission of the solution is maintained. The packing density of the evacuated capsules 340 within the solution may be greater than 30%. A higher packing density greater than 70% may maintain the visible light transmission, while minimizing the number and size of air pockets (reference number 330 in FIGS. 3(a) and 3(b)) to keep the insulation value as high as possible. The evacuated capsules 340 are dispersed to prevent clusters that are larger than the wavelength of visible light from forming and acting as light scattering centers.

Figure 6:
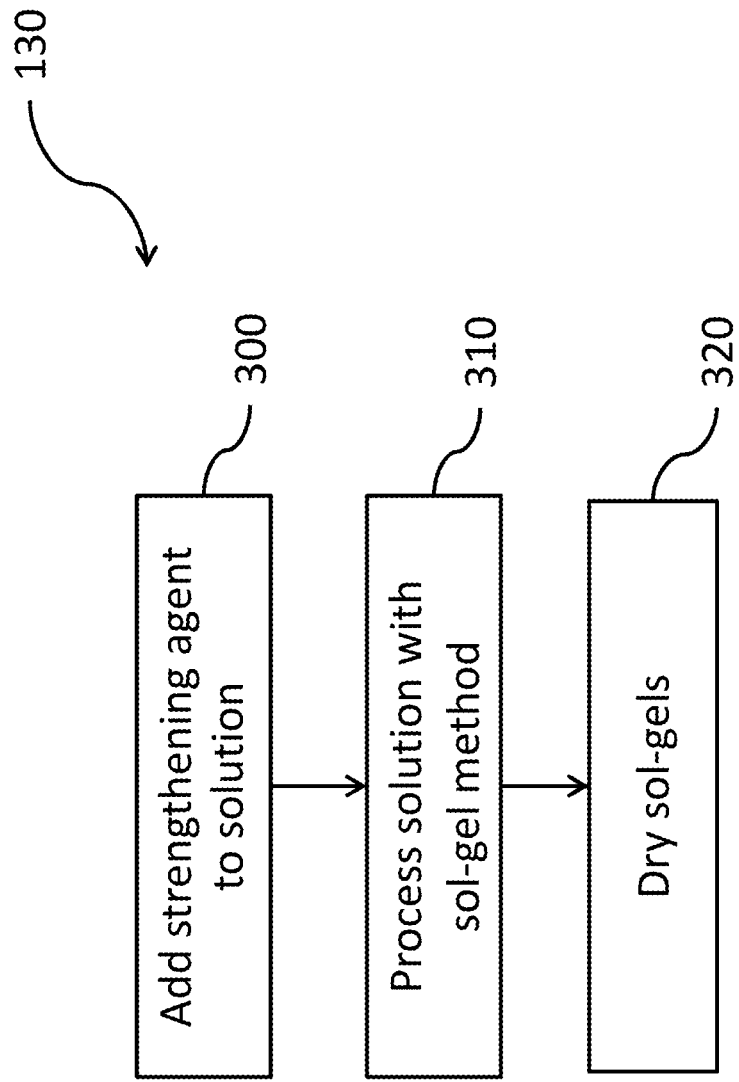
FIG. 6 shows a flowchart of a method of integrating evacuated capsules to form a layer according to exemplary embodiments of the invention.

As shown in FIG. 1, at step 130, the evacuated capsules 340 are then integrated by additional sol-gel processes to form a solid layer 300 of integrated and evacuated capsules 320 (see FIGS. 3(a) and 3(b)). The details of this process are shown in FIG. 6, which may include adding 1 mL of boric acid, poly(vinyl alcohol) (PVA), and glycerol (diluted 100 to 1 in water) to the solution in which the evacuated capsules were dispersed and suspended in step 120. As shown in FIG. 6, the PVA and the boric acid act as strengthening agents at step 300. The process continues at step 310 of FIG. 6, in which the solution is processed with a sol-gel method. For example, the solution may be added to 4 mL of TEOS in 4 mL of methanol with a drop of concentrated HCl that has been stirring at 300 revolutions per minute and room temperature for 2 hours. This mixture is stirred for about 30 seconds, poured into pans, and let sit overnight to form sol-gels.

The sol-gels are then dried by any suitable method at step 320 of FIG. 6. For example, the sol-gels may be covered in methanol and heated at 50° C. for 4 hours. All of the liquids are then removed and the sol-gels are covered with methanol again. This process is repeated for a total of 4 times. The sol-gels are then covered loosely in a petri dish and allowed to dry at ambient conditions for a few days to a few weeks. A drying agent such as trimethylchlorosilane may be used after the second rinse to make the surfaces more hydrophobic and accelerate the removal of water.

In another example, the sol-gels may be placed in a super-critical $CO_2$ drying chamber after the second rinse with methanol. $CO_2$ is then added at a pressure above approximately 6 bar at ambient temperature, to cover the sol-gels in liquid $CO_2$. The sol-gels are soaked for 2 hours, and this process is repeated 3 more times. The sol-gels are then removed from the drying chamber and allowed to sit in a loosely covered petri dish for a few hours to completely dry out.

In yet another example, the sol-gels may be covered in equal parts methanol and toluene in a sealed chamber. The sol-gels are heated to a temperature between 150° C. and 250° C., and the pressure is released quickly by opening a vent valve. The ratio of methanol and toluene may be adjusted to affect the critical point temperature based on the standard rule of mixtures and vapor point knowledge in the literature, and to optimize the rapid removal of solvent from the sol-gel pores without collapsing the pores 330 due to surface tension from the solvent.

Although the secondary shells 350 (see FIGS. 3(a) and 3(b)) are optional, they provide more volume that can be evacuated, such that there is less volume with air once the transparent layer 300 is formed. Preferably, the evacuated capsules 340 have a cubic or cylindrical shape, and are packed closely together to form a stack with very little air between the evacuated capsules 340. The packing density of the evacuated capsules within the dried sol-gel material may be greater than 30%. Advantageously, the packing density may be greater than 70%, in order to maximize the insulation value of the layer 300.

Figure 7:
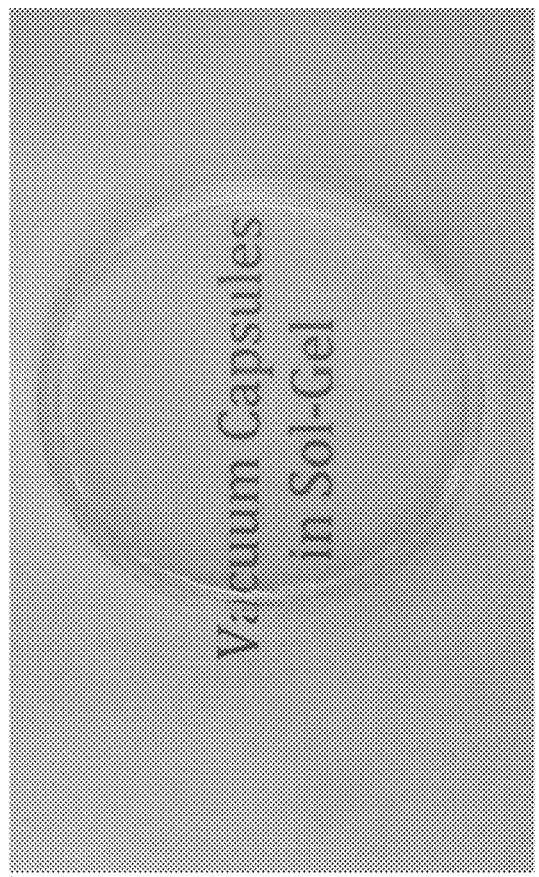
FIG. 7 shows an example of a layer that was produced by exemplary embodiments of the invention.
Figure 8:
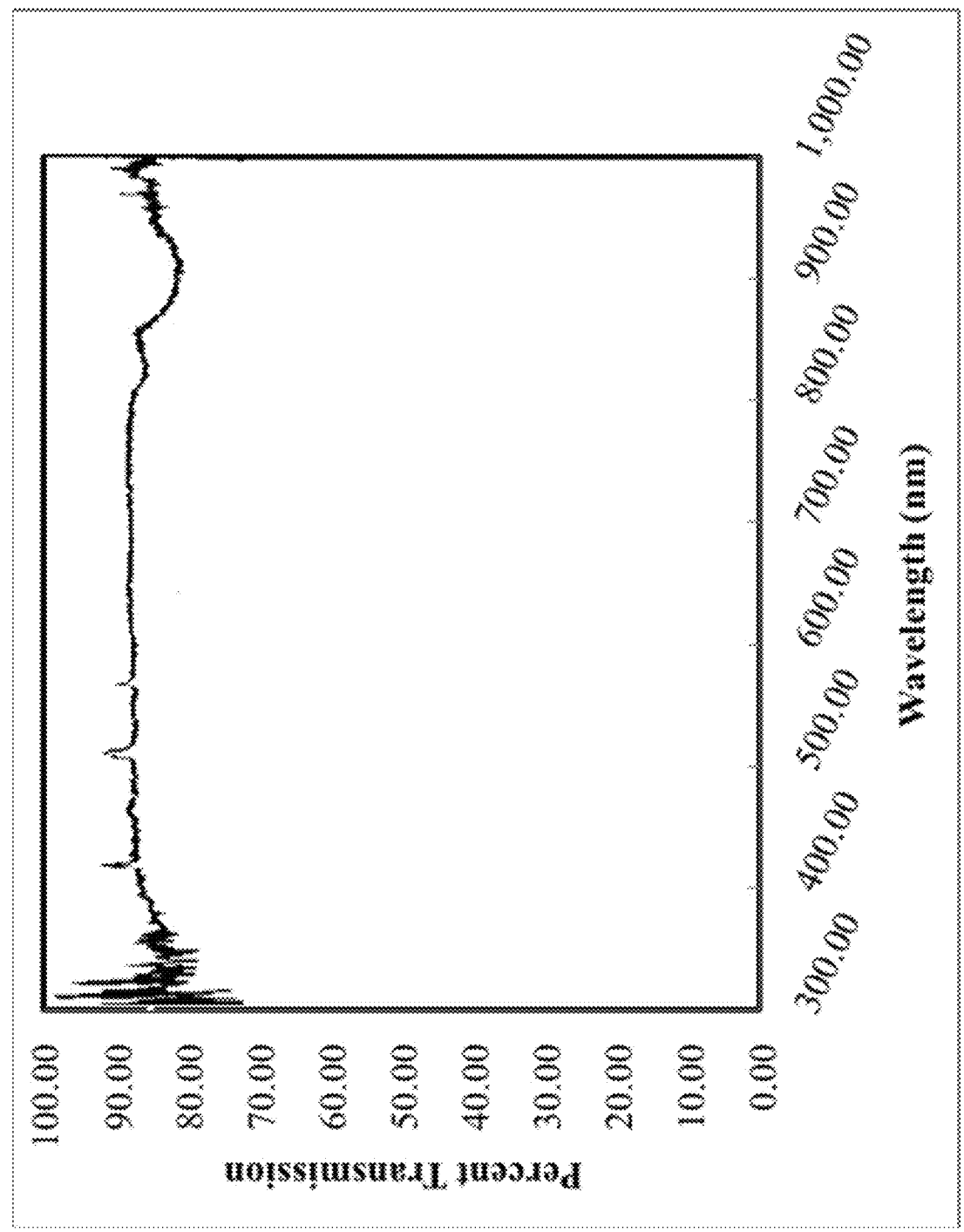
FIG. 8 shows the measured transmission of a film that was produced by exemplary embodiments of the invention.

An example of a layer 300 produced by the methods discussed above is shown in FIG. 7. Referring again to FIGS. 3(a) and 3(b), the layer 300 includes the evacuated capsules 340 that are distributed within the dried sol-gel material (i.e. secondary shell 350). In this example, the layer 300 is a film having a visible light transmission greater than 85%, a haze between 0% and 10%, a thickness (reference number 310 of FIG. 3(a)) of approximately 5 mm, and a diameter of approximately 75 mm. The measured transmission of the film is shown in FIG. 8. For most window applications, the layer 300 may be formed to have a visible light transmission greater than 75%. However, for applications in which tinting is required, the layer 300 may be formed to have a lower visible light transmission, such as greater than 30%. Tinting may be achieved by forming nanometer thick films of electrically conducting materials, such as metals, graphitic carbon, tin oxide, and zinc oxide, on the evacuated capsules, where the oxide deposition process is adjusted to give the films more metallic properties. Advantageously, the thermal conductivity of the layer 300 may be less than 0.02 W/m-K without a low-e coating, and between 0.01 and 0.001 W/m-K with a low-e coating. The thermal conductivity of the layer 300 depends on the thermal conductivity of the evacuated capsules 340, as well as the structure and configuration of the film. The layer 300 may be integrated between plastic films or glass sheets in order to provide a thermally insulating material that has a minimal effect on the visible transparency of the window on which it is ultimately affixed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method comprising:
    forming a composition consisting essentially of a plurality of hollow spherical silica shells within a solution;
    dispersing and suspending the hollow spherical silica shells within the solution such that a packing density of the hollow spherical silica shells within the solution is greater than 30%, and a visible light transmission of the solution is greater than 75%;
    processing the solution with a sol-gel method; and
    drying the processed solution to form a secondary shell of silica, wherein:
    the hollow spherical silica shells are integrated by the secondary shell to form a layer consisting essentially of the hollow spherical silica shells and the secondary shell,
    at least a portion of the hollow spherical silica shells have an internal volume at a pressure of less than 1 microtorr,
    each hollow spherical silica shell has a lateral dimension between 50 nm and 300 nm,
    the layer has a thickness between 3.175 mm and 6.35 mm,
    the layer has a thermal conductivity between 0.001 W/m-K and 0.02 W/m-K, and
    the layer has a visible light transmission of greater than 30% and less than 70%.

2. The method of claim 1, wherein the dispersing and suspending comprises:
    adjusting a pH of the solution to a value between 9 and 14, and
    adding a polycation or a polyanion to the solution.

3. The method of claim 1, wherein the packing density is greater than 70%.

4. The method of claim 1, further comprising adding a strengthening agent to the solution before processing the solution.

5. The method of claim 4, wherein the strengthening agent comprises at least one of poly(vinyl alcohol) or boric acid.

6. The method of claim 1, wherein the forming comprises:
    creating a template using dodecanethiol and cetyl-trimethylammonium bromide;
    coating the template with a silica-gel; and
    heating the template to a temperature of at least 250° C. in vacuum, resulting in the hollow spherical silica shells.

7. The method of claim 6, wherein the forming further comprises performing atomic layer deposition, physical vapor deposition, chemical vapor deposition, or solution phase deposition to deposit a low-emissivity coating on the hollow silica shells.

8. The method of claim 1, wherein each of the hollow spherical silica shells has a lateral dimension between 50 nm and 300 nm.

9. The method of claim 8, wherein the lateral dimension is between 80 nm and 100 nm.

10. A composition comprising:
    a layer consisting essentially of:
    a plurality of hollow spherical primary silica shells; and a secondary shell of silica integrated with the hollow spherical primary silica shells to form the layer, wherein:

each hollow spherical primary silica shell has a lateral dimension between 50 nm and 300 nm, at least a portion of the hollow spherical primary silica shells have an internal volume at a pressure of less than 1 microtorr, the layer has a thickness between 3.175 mm and 6.35 mm, the layer has a thermal conductivity between 0.001 W/m-K and 0.02 W/m-K; and the layer has a visible light transmission of greater than 30% and less than 70%.

11. The composition of claim 10, wherein the lateral dimension is between 80 nm and 100 nm.

12. The composition of claim 10, wherein at least a portion of the hollow spherical primary silica shells are concave.

13. The composition of claim 10, wherein at least a portion of the hollow spherical primary silica shells has thickness between 3 nanometers and 20 nanometers.

14. The composition of claim 10, wherein the secondary shell has a shape that is substantially cylindrical.

15. The composition of claim 10, further comprising boric acid, wherein the boric acid strengthens the layer.

16. The composition of claim 10, wherein at least a portion of the hollow spherical primary silica shells and the secondary shell form a pore.

17. The composition of claim 10, wherein the secondary shell is produced by a sol-gel method.

* * * * *